D. L. Allen.
Expanding Mandrel.
№ 95065. Patented Sept. 21. 1869
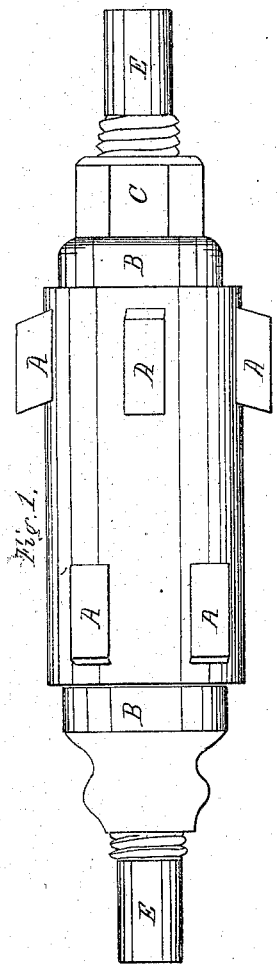
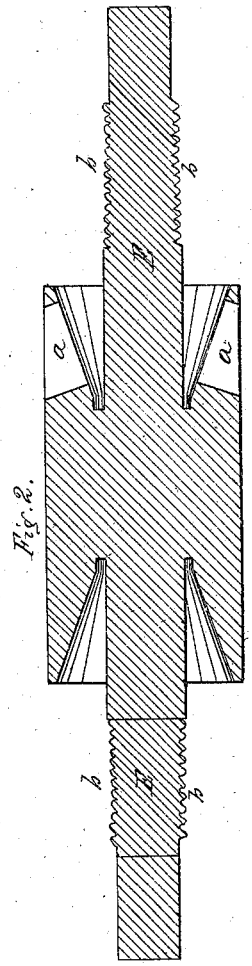
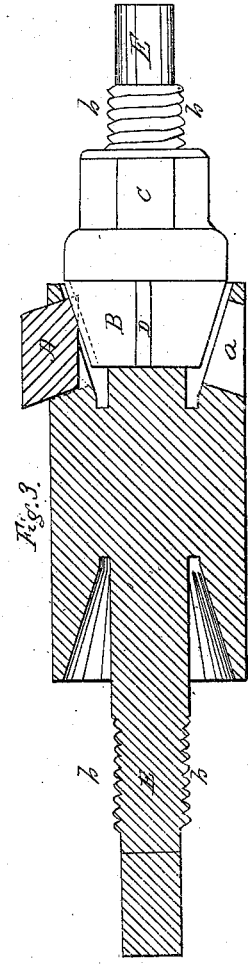
Witnesses
Geo H Cramer
Chs T Huston
Inventor
Daniel L. Allen

United States Patent Office.

DAVID L. ALLEN, OF WILLIAMSPORT, PENNSYLVANIA.

Letters Patent No. 95,065, dated September 21, 1869.

---

IMPROVED EXPANDING MANDREL.

---

The Schedule referred to in these Letters Patent and making part of the same.

---

*To all whom it may concern:*

Be it known that I, DAVID L. ALLEN, of the city of Williamsport, in the county of Lycoming, and State of Pennsylvania, have invented a new and useful Improvement in Expanding Mandrel-Chucks; and I do hereby declare that the following is a full, clear, and exact description of the construction and operation of the same, reference being had to the accompanying drawings, making a part of this specification, in which—

Figure 1 is a view of the mandrel, complete.

Figure 2 is a section of the mandrel, with cones, screw-nuts, and expanding chucks removed.

Figure 3 is also a section, with cones, screw-nuts, and expanding chucks in place, and showing the manner in which the latter are expanded.

Like letters in the figures of the drawings indicate like parts.

My invention consists of a solid mandrel, provided with expanding chucks, in combination with cones and screw-nuts, the said expanding chucks being so constructed as to fit and move in grooves of the cones, so that, by screwing up the nuts, the cones will cause the chucks to expand, and thus fit either straight or tapering holes of different sizes, and at the same time hold the work rigidly in place while being turned.

I construct my invention as follows:

A A are the expanding chucks;

B B, the cones; and

C C, the screw-nuts.

The ends of the mandrel are counterbored, to receive the cones.

The chucks are of an oblong shape, and have inclined ends.

Each chuck fits sufficiently loose in slots $a$, communicating with the bored ends of the mandrel, to be freely movable therein.

The outer under ends of the chucks are made to fit the inclined sides of the cones, each chuck fitting a groove, $d$, of the cones, and so constructed as to be held, and move freely therein, by means of guides, the edges of which will project from the sides of the grooves, and fit in narrow grooves in the sides of the chucks.

The ends of the slots in the mandrel are inclined, to correspond with the inclined ends of the chucks; thus the chucks work up and down in the grooves $d$ of the cones, and through the slots, according to the direction in which the nuts are revolved.

Upon the turned-down ends E E of the mandrel are provided screw-threads $b\ b$, upon which the screw-nuts fit and work.

The cones are so connected with the nuts, by means of a grooved joint, that they will move in the bores of the mandrel, and act upon the chucks, by revolving the nuts.

To hold the work desired to be turned, it is placed over the mandrel, and the chucks expanded until they fit the hole thereof, the chucks having an oblique movement, which, in combination with the cones, gives them a more solid basis, so that the work will be held more rigidly while being turned.

The chucks are arranged at equal distances apart around the mandrel, next to the ends thereof.

Having thus fully described my invention,

What I claim therein as new, and desire to secure by Letters Patent, is—

The screw-nut C, cone B, and chucks A, constructed and combined as herein described, in combination with the sold mandrel, recessed at each end, and with screw-thread extremities E, substantially as set forth.

DAVID L. ALLEN.

Witnesses:
GEO. A. CRAMER,
CHS. T. HUSTON.